United States Patent Office 2,769,580
Patented Nov. 6, 1956

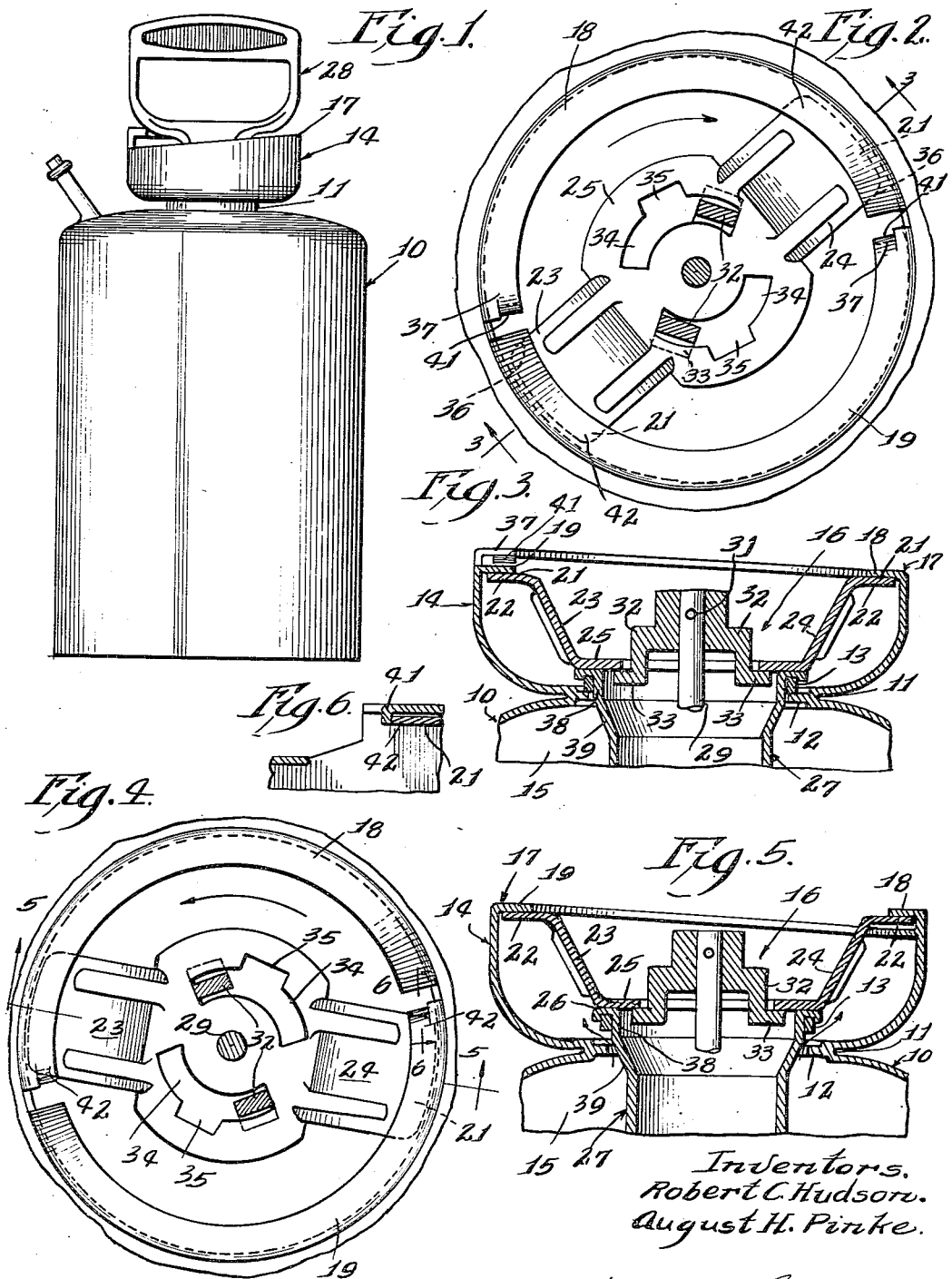

2,769,580

COMPRESSION SPRAYER

Robert C. Hudson, Glencoe, Ill., and August H. Pinke, Hastings, Minn., assignors to H. D. Hudson Manufacturing Company, Chicago, Ill., a corporation of Minnesota Application June 19, 1953, Serial No. 362,914

6 Claims. (Cl. 222—397)

The present invention relates to compression sprayers for spraying or dispensing under relatively high pressure any sprayable solution including insecticides, pesticides, agricultural chemicals, whitewash, paints, etc., and more particularly to such a manually operable sprayer in which a pump is removably or detachably mounted in the fill opening and to a novel safety arrangement or locking means for preventing the ejection of the pump assembly from the fill or access opening by the entrapped pressure in the tank.

Compression sprayers of this general type are provided with a pressure pump projecting into the supply tank or container for the liquid or sprayable solution, and adapted to be manipulated by hand to build up sufficient pressure in the tank or container to dispense the contained liquid or spraying solution through a spray nozzle attached to the end of a spray hose attached to the discharge port or outlet of the tank or container and controlled by a manually-actuated valve, whereby the operator may easily and conveniently direct the spray to a desired area.

The pump assembly including the pump cylinder and its plunger are removably or detachably mounted in the fill or access opening of the tank or container whereby this pump assembly is withdrawn from this opening whenever the supply or contents of the tank or container requires replenishing. To permit such ready withdrawal and replacement of the pump assembly in this fill or access opening, and to securely retain the pump assembly upon replacement in the opening, cooperating cam means are provided on the tank or container and on the pump assembly for secure retention of the pump assembly in operative position and in tight sealing contact between complementary sealing surfaces on the pump assembly and on the tank or container.

It is an important object of the present invention to provide a novel safety interlock for said cam means to prevent detachment or removal of the pump assembly before the internal pressure in the tank or container has been relieved sufficiently to prevent the contained pressure from forcibly ejecting the pump assembly from the fill or access opening.

The present invention further comprehends the provision of a novel means and manner of retaining a detachable and removable pump assembly in the fill or access opening of a compression sprayer until the internal pressure generated by the pump within the tank of the sprayer has been relieved sufficiently as to prevent this contained pressure from dislodging this assembly and causing possible injury to the user or operator of the sprayer. This is accomplished and retention assured by providing stops or abutments on the camming means of the tank or container whereby when relative rotation between the tank or container and the pump assembly is effected, such rotation is interrupted by these stops and excess pressure in the tank relieved before the rotating camming surfaces employed in sealing the pump barrel in the tank or container are completely disengaged.

The present invention is an improvement over that disclosed in the co-pending application of Pinke, Meeker, Oys and Hudson, Serial No. 297,332, filed July 5, 1952.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a view in side elevation of a compression sprayer tank in which is embodied the present invention.

Fig. 2 is an enlarged, fragmentary top plan view of the tank or container and the upper portion of the pump assembly, but with the handle broken away above its depending lugs and the cover or closure for the cylinder having been cammed to sealing position by rotation of the handle in a clockwise direction.

Fig. 3 is a view in vertical cross section taken in a plane represented by the line 3—3 of Fig. 2 and viewed in the direction of the arrows.

Fig. 4 is a view similar to Fig. 2 but with the handle rotated in a counter-clockwise direction until the camming arms or projections engage the stops or abutments at an end of the camming flanges on the tank or container, in which position the cover or closure is elevated and the seal between the pump cylinder and the tank is broken to relieve the pressure in the tank.

Fig. 5 is a view in vertical cross section taken in a plane represented by the line 5—5 of Fig. 4 and viewed in the direction of the arrows.

Fig. 6 is an enlarged fragmentary view in vertical cross section taken on the line 6—6 of Fig. 4 and viewed in the direction of the arrows.

Referring to the disclosure in the drawings, the present invention is shown embodied in a compression sprayer having a pressure tank or container 10 adapted to receive and contain a substantial quantity of a liquid spray or sprayable solution capable of being dispensed or sprayed under pressure. The tank or container 10 is shown formed at its upper end with a reduced neck or constriction 11 and an annular, inwardly projecting flange 12 defining a filling or access opening and also forming a seat for a sealing gasket 13, and from this constriction the upper end is provided with an outwardly and upwardly flared enlargement 14 providing a funnel top for facilitating pouring of a sprayable solution into the interior 15 of the tank or container 10 when the pump assembly 16, detachably mounted in the filling or access opening, is removed.

The top or upper edge 17 of this enlargement or funnel 14 is bent or flanged inwardly to provide spaced or interrupted and inclined camming flanges 18 and 19, each adapted to receive therebeneath a similarly inclined, camming surface 21 on the elevated flanged ends 22 of a pair of arms or projections 23 and 24. These arms or projections 23 and 24 extend radially outward from a centrally depressed part providing a cover or closure 25 for the upper and outwardly flanged end 26 of a pump cylinder or barrel 27, the flanged end 26 being so formed as to provide a downwardly opening annular channel adapted to receive therein and retain in depending position the annular gasket or sealing ring 13.

It will be apparent from the disclosure in Figs. 3 and 5 that when the inclined camming surfaces 21 on the elevated flanged ends 22 of the arms or projections 23 and 24 are moved into contacting engagement with the underside of the complementary, inclined camming surfaces on the inturned flanges 18 and 19 on the enlargement or funnel 14 of the tank or container 10, upon clockwise rotation of the handle 28, the cover or closure 25 and the arms 23 and 24 are moved to the position shown in Figs 2 and 3. In this position the cover or closure is depressed and it in turn compresses the gasket or sealing ring 13 into liquid and air-tight sealing engagement with the seat of the flange 12 on the constricted portion 11 of the tank or container 10. This engagement of the gasket or sealing ring 13 with the flange 12 provides an effective sealing means to prevent leakage between the adjoining surfaces of the pump cylinder or barrel 27 and the encompassing annular flange 12 of the tank.

Mounted for reciprocation in the pump cylinder is a piston rod 29 secured to the handle 28 by a pin or other attaching means 31 adapted to carry at its lower end a piston. The lower end of the cylinder is provided with a suitable check valve which may be of the type shown in the De Frees Patent No. 2,248,814, granted July 8, 1941, or that shown in the Winks et al. Patent No. 2,529,645, granted November 14, 1950. This construction permits the discharge of air by the pump piston into the tank or container 10 to build up pressure in the tank and prevents the reverse flow of the air and contained liquid or sprayable solution from the tank into the pump cylinder.

The lower end of the handle 22 is provided with depending lugs 32 each provided with a flange or projection 33 with these oppositely disposed flanges or projections extending outwardly. Each depending lug 32 and its projection or flange 33 is adapted to be received in oppositely spaced arcuate slots 34 in the cover or closure 25. These slots open through the cover into the upper end of the pump cylinder 27 and each is provided with an intermediate offset or enlargement 35 for the entry or removal of the oppositely extending flanges or projections 33 on the lugs 32, but with the width of the remainder of the arcuate slots 34 such as to retain these flanges or projections 33 against the underside of the depressed part forming the cover 25. By means of this construction and arrangement, when the flanges or projections 33 are moved into alignment with the offsets 35 in the arcuate slots 34, the handle 28 may be readily lifted or withdrawn vertically, or if the handle was previously withdrawn, these flanges 33 may be readily inserted or projected through the offset portions 35 of the slots 34 after which turning of the handle 28 positions these flanges beneath the margins of the narrower portions of the slots 34 and the handle is locked to or engaged with the cover.

With the pump assembly 16 inserted into the fill or access opening of the tank 10 and the handle 28 and cover 25 disposed in the position shown in Figs. 2 and 3 in which position the handle has been turned in a clockwise direction whereby the lugs 32 are disposed in one end (Fig. 2) of the slots 34, further rotation of the handle in the same or clockwise direction will carry along or rotate the cover 25 and its arms or projections 23 and 24 whereby the forward or lower inclined edge 36 of each camming surface 21 on the elevated flanged ends 22 enters beneath the rear, elevated inclined end 37 of one of the spaced, inclined flanges 18 and 19. Continued rotation of the handle 28 and cover 25 causes the latter to be pressed or forced downwardly against the upper flanged end 26 of the pump barrel or cylinder 27, whereby the annular gasket or sealing ring 13 carried by the channelled end of the barrel or cylinder is tightly compressed downwardly against the rigid annular flange or seat 12 on the constricted neck of the tank whereby a most effective seal is provided between the upper end of the pump cylinder or barrel 27 and the tank 10 to seal the contents of the tank against leakage.

To facilitate exhaust of the air pressure trapped within the tank or container 10 before the camming means becomes disengaged or released and thereby preventing any entrapped air pressure from forcibly dislodging the removable pump assembly, including its barrel or cylinder 27, the handle 28 and associated parts, and the cover 25 and its camming arms or projections 23 and 24, and unexpectedly and forcibly ejecting this assembly from the fill or access opening of the tank or container 10, the pump barrel or cylinder 27 is provided at its upper open end with an enlarged neck or collar 38 conformably received within and of but slightly less diameter than the fill or access opening defined by the flange 12. This neck or collar is connected by an inwardly and downwardly tapered portion 39 to the smaller circumference of the remainder of the body of the barrel 27.

The effective length of this upper enlargement or collar 38 of the depending body of the barrel or cylinder 27 below the sealing face of its encompassing gasket 13, is such that as the camming means is being moved to released position and the cam arms or projections 23 and 24 travel upwardly with the rise of the cam surfaces on the flanges 18 and 19 of the tank or container 10, the pump assembly normally rises a like amount and normally withdraws the gasket 13 from its seat on the internal flange 12 defining the fill or access opening. Then as the compression on the gasket is relieved and the pump assembly rises, the tapered portion of the barrel which is of substantially less diameter than the fill or access opening enters this opening, whereby the pressure in the tank or container is relieved through the annular escape space about the tapered enlargement 39.

The present invention comprehends the provision of a novel safety device or locking means preventing removal of the pump assembly until sufficient pressure entrapped in the tank has been relieved to permit safe removal. Thus, should the sealing face of the gasket 13 have a tendency to stick to its seat or to swell and thereby not relieve the entrapped air in the tank by the time the operator or user has turned the handle 28 to a position short of disengagement of the camming surfaces 21 on the elevated flanged ends 22 from the camming flanges 18 and 19 on the tank 10, the operator or user is assured that these camming members will be retained in engagement until sufficient pressure is relieved to permit safe removal of the pump assembly. This is accomplished by providing the upper or elevated end 37 of each of the inclined camming flanges 18 and 19 with a depending stop or abutment 41.

These stops or abutments 41 against which the upper or elevated edge 42 of the flanged ends 22 abut, have been found highly effective for as the handle 28 is turned in a counter-clockwise direction toward release position, it carries therealong the arms or projections 23 and 24 with their flanged ends 22 riding on the underside of the camming flanges 18 and 19 on the tank until these ends positively engage the stops or abutments 41. The operator or user may then wait until the pressure is relieved, although the delay resulting from such engagement is found normally sufficient to relieve any excess pressure that might result in forcible ejection of the pump assembly.

Thus the present invention provides a positive safety feature that prevents the pump assembly from being dislodged or forcibly ejected from the tank by the pressure of the entrapped air, and eliminates any danger of injury to the operator or user.

Having thus disclosed the invention, we claim:

1. A compression sprayer comprising a tank having an enlarged upper end provided with an access opening for a liquid spray, a pump having a cylinder mounted in the opening and removable for filling the tank, sealing means carried by the upper end of the cylinder and an annular seat provided in the tank about the access opening, a closure carried by the pump and seating on the upper end of the cylinder, camming means forcing the closure downwardly against the adjacent upper end of the cylinder to compress the sealing means against the seat and seal the interior of the tank, said cylinder having a relatively short neck portion at its upper end conformably received within the access opening when the tank is sealed and a constriction directly beneath the neck portion of the cylinder for relieving the entrapped pressure in the tank about the constriction as the cylinder is elevated by the pressure in the tank and before the camming means is disengaged, and a safety interlock associated with said camming means for preventing disengagement of the camming means until the entrapped pressure in the tank is relieved.

2. A compression sprayer comprising a tank having an enlarged upper end provided with an access opening for a liquid spray, a pump having a cylinder detachably mounted in the opening and removable for filling the tank, sealing means carried by the upper end of the cylinder and an annular seat in the tank about the access opening, a closure seating on the upper end of the cylinder, complementary camming surfaces on said enlarged upper end of the tank and on the cover which when subjected to rotation relative to each other in one direction forces the closure against the adjacent end of the cylinder to compress the sealing means and seal the interior of the tank, and when rotated relative to each other in the opposite direction moves the closure toward release position to relieve the pressure on said sealing means and permit removal of the cover and pump from the opening, said cylinder having a relatively short neck portion at its upper end adapted to be conformably received within and depending into the access opening and merging into a depending constricted portion of the cylinder for relieving the entrapped pressure in the tank about the constricted portion as the cylinder is elevated by the pressure in the tank and before the camming surfaces are disengaged, and a safety interlock for said camming surfaces to prevent disengagement thereof until the pressure in the tank is relieved sufficiently to permit manual lifting and removal of the pump.

3. In a compression sprayer having a tank for a spray solution and provided with a constricted filler opening and an enlargement at the top providing a funnel for facilitating supplying the tank with the solution to be sprayed, a pump having a barrel adapted to be detachably mounted in the filler opening for supplying the tank with sufficient air pressure to permit continuous spraying over an extended period of time, said enlargement having spaced inturned flanges providing inclined camming surfaces and said pump having a cover provided with spaced arms each having an inclined camming surface adapted to be received beneath the camming surfaces on said enlargement and when rotated in one direction locating the pump barrel in the filler opening and sealing the interior of the tank to permit the pump to build up air pressure in the tank, and when moved in the opposite direction disengaging the camming surfaces and permitting removal of the pump and its barrel from the tank, said barrel having an external flange and sealing means carried by the flange at the upper open end of the barrel, the barrel being of maximum diameter below said flange and thereat conformably received within the filler opening and provided with a tapered constriction beneath said portion of maximum diameter for relieving entrapped pressure in the tank about said constriction as the barrel is elevated by the entrapped pressure in the tank and before the camming surfaces are disengaged, and an abutment on one or more of said camming surfaces for preventing disengagement of the camming surfaces until pressure is relieved in the tank.

4. A compression sprayer comprising a tank having an enlarged upper end provided with an access opening for a liquid spray, a pump having a cylinder detachably mounted in the opening and removable for filling the tank, sealing means carried by the upper end of the cylinder and an annular seat provided in the tank about the access opening, a cover for said pump adapted to seat on the cylinder, complementary camming means on the upper end of the tank and on said cover for pressing the cover against the top of the cylinder to compress the sealing means against the seat and seal the interior of the tank, means for relieving the entrapped pressure in the tank before the camming means is disengaged including an enlargement on the upper end of the cylinder adapted to be conformably received within the access opening, said enlargement being of greater diameter than the remainder of the cylinder and of such length that as the camming means is being released but prior to its final release, the pressure in the tank dislodges said enlargement from the access opening to permit the escape of the trapped pressure from the tank, and a safety interlock on said camming means for delaying disengagement of the camming means until entrapped pressure in the tank is relieved.

5. In a compression sprayer having a tank provided with a filler opening and an upwardly flared enlargement providing a funnel, a pump assembly having a barrel detachably and removably mounted in the filler opening, cooperating camming surfaces on said enlargement and on said pump barrel which when moved into camming engagement locate the barrel in the filler opening and seal the interior of the tank to permit the pump assembly to build up pressure in the tank, and when moved in the opposite direction release the barrel upon disengagement of the camming surfaces and permit removal of this pump assembly from the tank, means for relieving entrapped pressure in the tank before the camming surfaces are disengaged and including an enlargement on the end of the barrel conformably received in the opening when the tank is sealed and of such length as to leave the opening to relieve the pressure in the tank whereby a portion of the barrel below and of lesser diameter than said enlargement is exposed when the barrel is elevated in the opening by the trapped pressure, and a stop on one or more of said camming surfaces to prevent complete disengagement of the camming surfaces and release of the barrel until pressure is relieved in the tank.

6. In a compression sprayer having a tank provided with a filler opening and an upwardly flared enlargement disposed above said opening, a pump assembly detachably and removably mounted in the filler opening and including a pump cylinder and a cover for said cylinder having inclined camming surfaces, complementary inclined camming surfaces on said enlargement which when engaged by rotation of said camming surfaces on said cover locate the pump cylinder in the filler opening and seal between the exterior of the cylinder and the interior of the tank to permit the pump assembly to build up pressure in the tank, and which when the cover is rotated in the opposite direction permits disengagement of the camming surfaces and removal of the pump assembly from the tank, said cylinder having a relatively short collar adjacent its upper end adapted to be conformably received within said filler opening and a restricted diameter below said collar for relieving the entrapped pressure in the tank about the restriction as the cylinder is elevated by the entrapped pressure and before said camming surfaces are disengaged to permit removal of the cylinder and pump assembly, and an abutment on one or more of said camming surfaces and in the path of travel of the complementary camming surfaces for retaining said camming surfaces engaged until sufficient pressure is relieved in the tank to permit safe withdrawal of the pump assembly.

References Cited in the file of this patent
UNITED STATES PATENTS

| | | |
|---|---|---|
| 2,111,961 | Brandt | Mar. 22, 1938 |
| 2,203,801 | Swank | June 11, 1940 |
| 2,282,172 | Frees | May 5, 1942 |
| 2,600,703 | Strom | June 17, 1952 |